C. HASTINGS.
SUPPLEMENTAL TIRE FOR VEHICLE WHEELS.
APPLICATION FILED NOV. 5, 1914.

1,127,239.

Patented Feb. 2, 1915.

UNITED STATES PATENT OFFICE.

CLIVE HASTINGS, OF ATCHISON, KANSAS.

SUPPLEMENTAL TIRE FOR VEHICLE-WHEELS.

1,127,239.   Specification of Letters Patent.   Patented Feb. 2, 1915.

Application filed November 5, 1914. Serial No. 870,348.

*To all whom it may concern:*

Be it known that I, CLIVE HASTINGS, a citizen of the United States, residing at Atchison, in the county of Atchison and State of Kansas, have invented new and useful Improvements in Supplemental Tires for Vehicle-Wheels, of which the following is a specification.

My invention relates to supplemental tires for vehicle wheels, more particularly to such as are furnished with pneumatic tires whereby the vehicle, such as an automobile, may be readily changed from its adaptation to ordinary road use and made applicable for use upon the rails of a railroad track.

The main object of my invention is to provide metal flanged tires so constructed as to enable a railroad official, or other person, to attach the same quickly and securely to the vehicle wheels, and after the run on the track has been made to permit of the easy removal of the metallic flanged tires so as to allow the automobile to continue its way over ordinary roads.

With this and other objects in view, the invention consists in the construction, combination and arrangement of parts hereinafter fully described, and illustrated in the accompanying drawing, it being understood that various changes in form, proportions, and minor details may be made within the scope of the invention.

Figure 1:
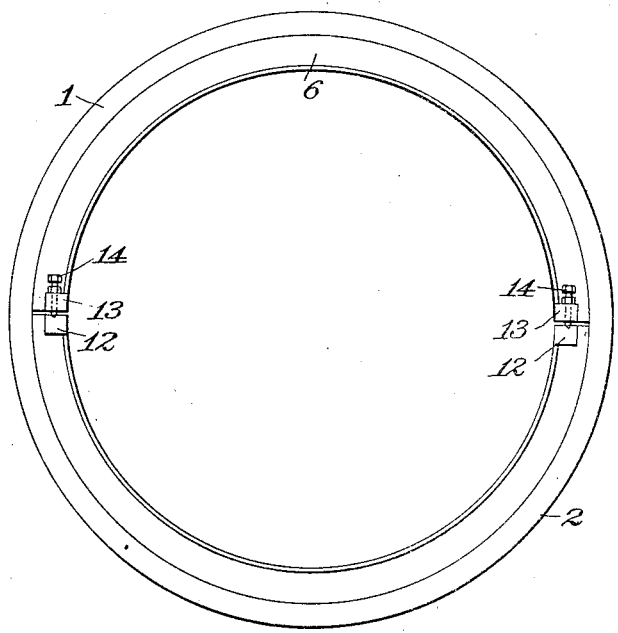
Figure 2:
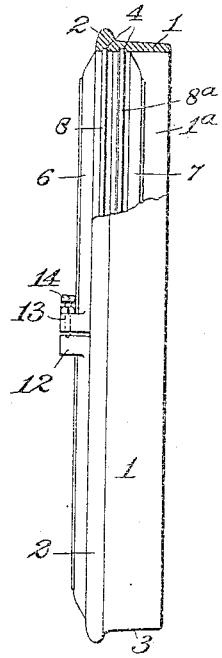
Figure 3:
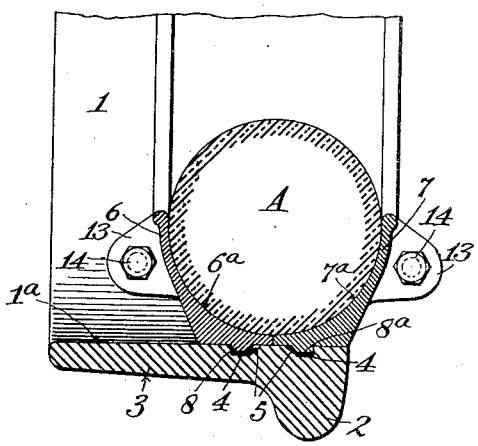
Figure 4:
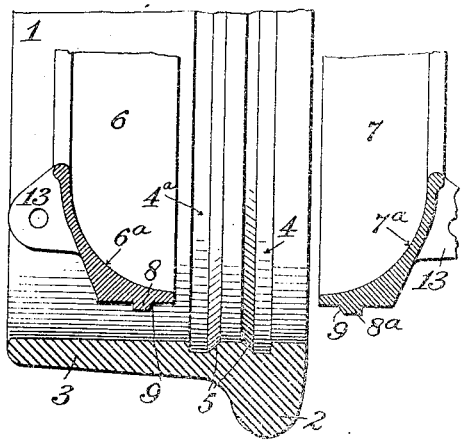

In the accompanying drawing, forming a part of this specification, Figures 1 and 2 are, respectively, side and edge views of my invention. Figs. 3 and 4 are enlarged views in cross section.

1 represents an annular member of any suitable material, made in one piece, the inner surface 1ª of which, except as hereinafter described, being plain. The outer or tread surface of this annular member has a continuous flange 2 for engagement with the side of the rail, and a part 3, the outer surface or tread of which is adapted to engage the top of the rail. Upon the inner surface of the annular flanged member 1 are a pair of grooves 4 running continuously around it. One of the grooves 4 is preferably placed directly over the flange 2, as shown, while the other groove 4ª is parallel and substantially in close proximity to its companion groove. The inner walls of the grooves 4 are inclined, as shown at 5, for a purpose hereinafter explained.

6 and 7 are rigid annular members, the inner surface of each being curved as shown by 6ª or 7ª, so that when these two annular members are brought together, as in Fig. 3, they will fit the tread and parts of the sides of the inflated tire. The outside of each member 6 and 7 is provided with a tongue 8 or 8ª, the inner side of each tongue being inclined as at 9.

In the use of my supplemental tire the members 6 and 7 are placed around the inflatable tire A, preferably when the latter is in a somewhat deflated condition. By means of the tongues 8, 8ª and grooves 4, 4ª the members 6, 7 are held upon the annular member 1. The angularity of the tongues 8, 8ª, as shown at 9, and the corresponding angularity of the grooves 4, as at 5, permit of an easy adjustment of the tongue and groove connection. The tire may now be fully inflated when the curved surfaces 6ª and 7ª will make a complete holding seat for the tire.

After the sectional members 6 and 7 have been placed upon the tire and upon the annular member 1, they are forced apart by means of screws 14 which pass through lugs 13 of one member and rest upon the lugs 12 of the other member, as shown in Fig. 1. Thus it will be seen that the annular member 1, with its tread surface and flange, and the sectional members 6 and 7 serve to make a strong composite rigid tire for automobile wheels adapted for use upon railroad rails. Preferably the members 6 and 7 are each composed of two sections, although a greater number may be employed. I have found in practice that they may be made of iron, and the flanged member 1 preferably of steel.

By my construction the danger of a metallic tire slipping off the automobile wheel is reduced to a minimum, and the simplicity of construction enables attachment to or detachment from vehicle wheels with great expedition.

While I have herein shown and particularly described the preferred embodiment of my invention, I do not wish to be limited to the precise details of construction shown; but Having described my invention, I claim as new and desire to secure by Letters Patent:—

1. A supplemental tire for vehicle wheels comprising two members adapted to fit over the tread of the vehicle wheel tire, each of said members consisting of an annulus having a tongue running around its exterior surface, an annular flanged member having a tread, and a pair of grooves encircling its interior, and means to clamp the said two members in tongue and groove engagement with the interior surface of said annular flanged member.

2. A supplemental tire for vehicle wheels comprising two members adapted to fit over the tread of the vehicle wheel tire, each of said members consisting of a sectional annulus having a tongue running around its exterior surface, an annular flanged member having a tread, and a pair of grooves encircling its interior, and means to clamp the said two members in tongue and groove engagement with the said annular flanged member.

3. A supplemental tire for vehicle wheels comprising two members adapted to fit over the tread of the vehicle wheel tire, each of said members consisting of a sectional annulus having a tongue running around its exterior surface, an annular flanged member having a tread, and a pair of grooves encircling its interior, and means upon each sectional annulus for forcing the sections apart so as to make a firm tongue and groove connection between the sectional members and the annular flanged member when in engagement.

In testimony whereof I affix my signature in presence of two witnesses.

CLIVE HASTINGS.

Witnesses:
GEO. H. EDWARDS,
A. B. BRADLEY.